United States Patent [19]

Schill

[11] 4,123,959
[45] Nov. 7, 1978

[54] SLICING MACHINE FOR BACON OR THE LIKE

[75] Inventor: Hermann Schill, Kehl, Fed. Rep. of Germany

[73] Assignee: Maja-Maschinenfabrik Hermann Schill GmbH, Fed. Rep. of Germany

[21] Appl. No.: 825,200

[22] Filed: Aug. 17, 1977

[30] Foreign Application Priority Data

Aug. 27, 1976 [DE] Fed. Rep. of Germany ....... 2638612

[51] Int. Cl.² .............................................. B26D 4/00
[52] U.S. Cl. ........................................ 83/874; 83/648;
83/544; 83/DIG. 1; 99/589
[58] Field of Search .................. 83/4, 546, 440.2, 856,
83/648, 858, 544, DIG. 1, 545; 99/589, 588

[56] References Cited

U.S. PATENT DOCUMENTS

| | | | |
|---|---|---|---|
| 1,383,133 | 6/1921 | Lucke | 83/4 X |
| 3,063,320 | 11/1962 | Beasley | 83/546 X |
| 3,733,997 | 5/1973 | Beasley | 83/4 X |
| 3,742,841 | 7/1973 | Beasley | 99/589 |
| 3,747,512 | 7/1973 | Schill | 83/4 X |
| 3,858,502 | 1/1975 | Townsend | 99/589 |
| 3,898,923 | 8/1975 | Greider | 99/589 |

Primary Examiner—Frank T. Yost
Attorney, Agent, or Firm—Peter K. Kontler

[57] ABSTRACT

A bacon slicing machine wherein the product is placed onto the exposed horizontal supporting surface of a table which is movable between an extended and a retracted position. The front portion of the table overlies the cutting edge of the knife and the apex of a rotary feeding wheel in the extended position of the table to thus prevent injury to the hands of an attendant. A spring biases the table to the extended position, and a bar is provided at the rear end of the table to be depressed by the hips of an attendant standing behind the table in order to move the table to the retracted position in which the product can be pushed along the supporting surface, along an upwardly or downwardly inclined platform which forms part of the front portion of the table, and into the range of the feeding wheel. The supporting surface of the table and the cutting plane of the knife make an acute angle of between 15° and 50°. A switch is provided to arrest the motor for the feeding wheel when the table leaves the retracted position, and the table is pivotable to raise its front portion above the feeding wheel and the knife subsequent to movement of the table to the extended position.

27 Claims, 6 Drawing Figures

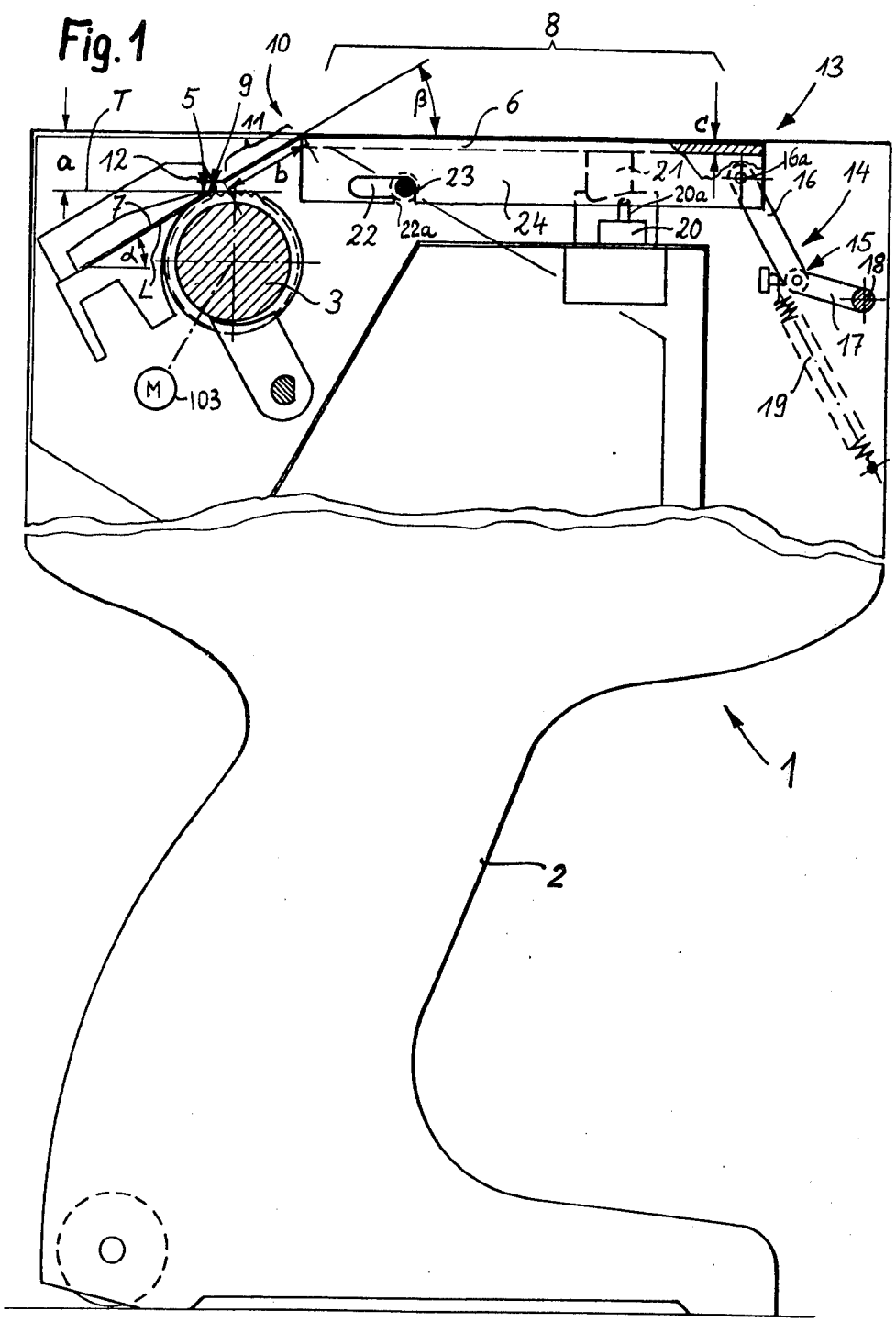

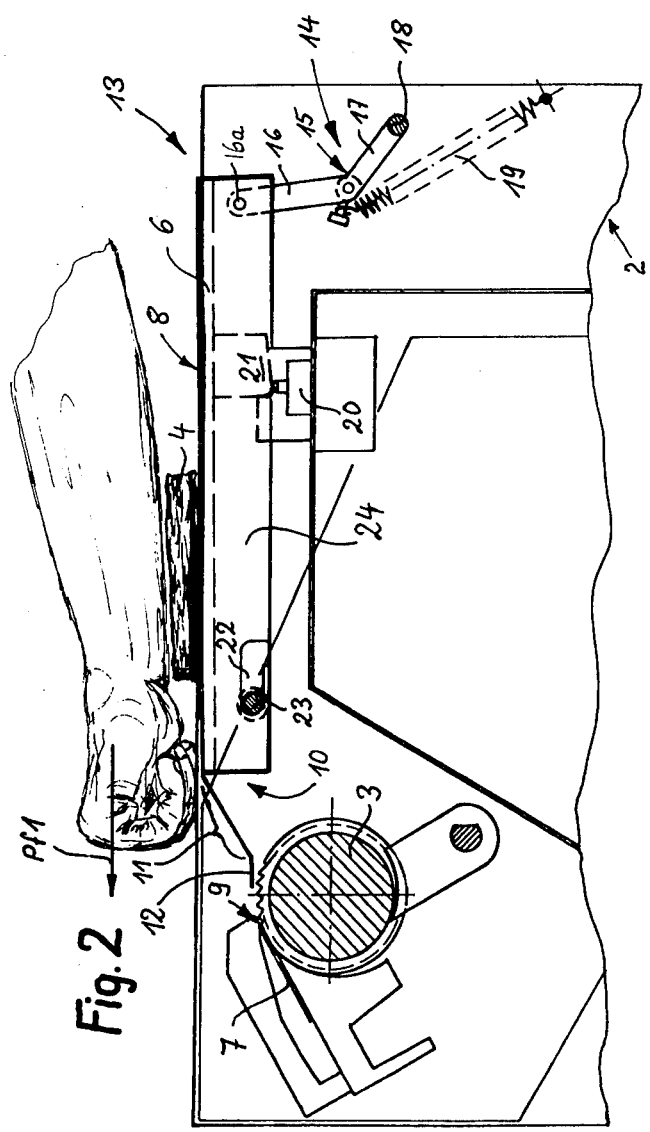

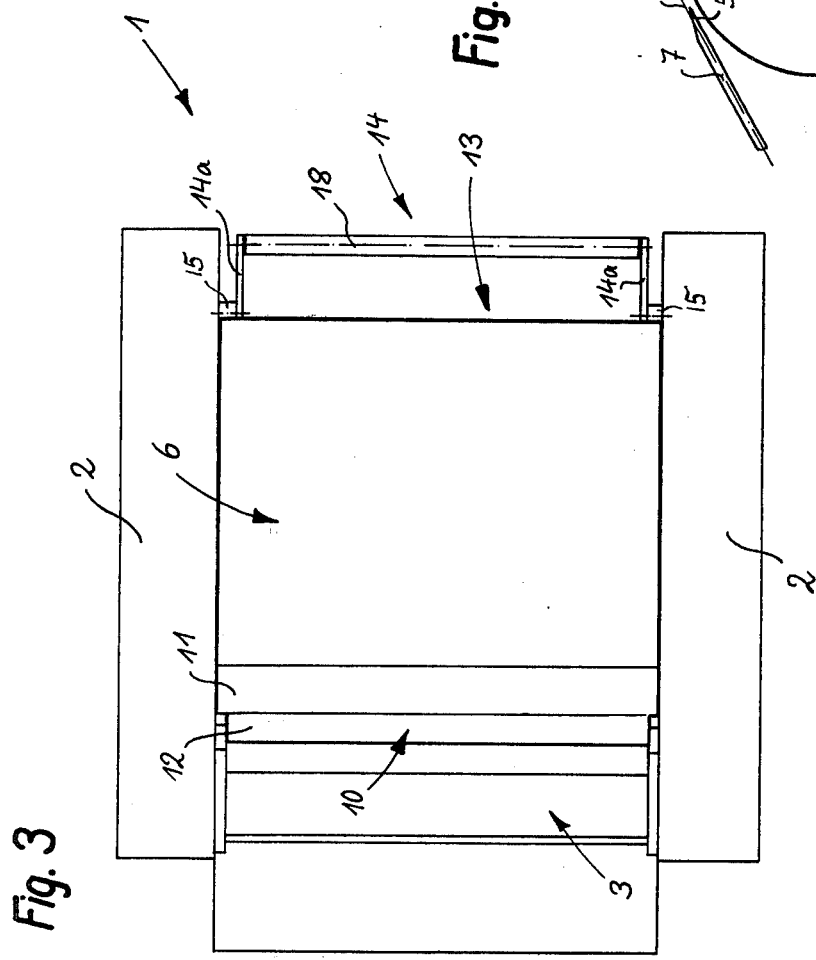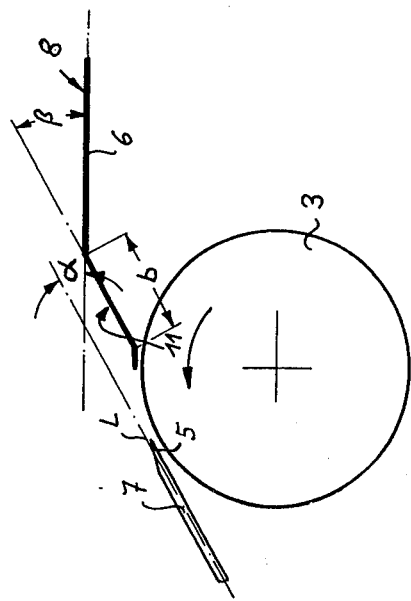

SLICING MACHINE FOR BACON OR THE LIKE

BACKGROUND OF THE INVENTION

The present invention relates to slicing machines in general, and more particularly to improvements in machines for slicing bacon or analogous products. Still more particularly, the invention relates to improvements in slicing machines of the type wherein the product can be advanced by hand into the range of a preferably rotary feeding device which moves the product against the cutting edge of the knife. In such slicing machines, the table which supports the product is open from above to afford access to its upper surface.

A drawback of presently known slicing machines of the just outlined character is that an attendant is likely to injure his or her hand or hands if the hands slip relative to the product on the table and move forwardly toward the cutting station. Such accidents can occur due to inexperience or carelessness of the attendant. The presence of the feeding device in the region of the cutting edge also contributes to the possiblity of injury because the feeding device is likely to entrain the hand or hands into the range of the cutting edge.

Proposals to reduce the likelihood of injury to attendants include the provision of belts, rollers or other types of transporting means which take over the transport of a product immediately or shortly ahead of the feeding device. Such transporting means necessitate the provision of counterrolls, guides, protective housings and other auxiliary equipment which contributes to initial and maintenance cost of the machine. Moreover, though the hands of attendants are protected from injury, the transporting means and the auxiliary components prevent immediate access to the cutting station, e.g., for the purposes of cleaning. Still further, since the products (such as bacon, meat loaf or the like) come in a variety of sizes and shapes, it is normally desirable to construct the slicing machine in such a way that the hand or hands of an attendant can guide and advance the product at a greater distance from as well as in close proximity to the cutting station.

It was already proposed to enhance the action of the product transporting means by providing for the product a path at least certain portions of which slope downwardly so that the weight of the product assists the movement toward the cutting station. However, such slicing machines are also likely to injure the hand of a careless or inexperienced attendant, especially when the shape of the product which is manipulated deviates from a normal shape so that the product must be guided by hand into close proximity of the cutting station. If the knife and the feeding device are shielded by a housing or shroud, the latter must be removed before the attendant can gain access to the cutting station.

German Offenlengungsschrift No. 2,250,087 discloses a further slicing machine with an open product-supporting table which allows for convenient manipulation of the product in close proximity to the cutting station. The likelihood of injury to attendants is reduced by mounting the table for movement relative to its support so that the table can partially overlie the knife and the feeding device.

OBJECTS AND SUMMARY OF THE INVENTION

An object of the invention is to provide a slicing machine which is less likely to cause injury to attendants in spite of the fact that it allows for convenient manipulation of the product in close proximity to the cutting station.

Another object of the invention is to provide a slicing machine which is constructed and assembled in such a way that the hand or hands of an attendant bypass the cutting station in the event of slippage along the product-supporting table and/or with respect to the product on the table.

A further object of the invention is to provide a slicing machine wherein the components which are likely to cause injury are automatically concealed when the machine is not in use.

An additional object of the invention is to provide a slicing machine wherein the product-supporting table can be moved to an optimum position to afford access to the cutting station and/or to other normally concealed or confined parts when the machine is idle.

A further object of the invention is to provide novel and improved safety devices which can be used in a slicing machine of the above outlined character.

An anciliary object of the invention is to provide a novel and improved product-supporting table for use in bacon slicing and like machines.

A further object of the invention is to provide a slicing machine which can be coupled to conventional product weighing and packing machines.

The invention is embodied in a machine for slicing bacon or analogous products. The machine comprises a frame or an analogous support, a knife which is intalled in the support and defines a cutting plane, a roller or another suitable mobile product feeding device which is adjacent to the cutting edge of the knife, and a table which is mounted in the support for movement between first or inoperative and second or operative positions in which a portion (preferably the front portion) of the table respectively overlies and exposes the cutting edge and the feeding device. The table has a preferably horizontal product supporting surface which is accessible from above so that a product which is placed onto the surface can be manually advanced forwardly along the supporting surface and into the range of the feeding device in the second or operative position of the table. In accordance with a feature of the invention, the cutting plane and the supporting surface make an acute angle of at least 15°, preferably 20°-50° and most preferably approximately 30°.

The supporting surface can be located at a level above or below the cutting edge of the knife. In the first instance, the front portion of the table preferably include a platform whose upper side slopes downwardly toward the apex of the feeding device. The upper side of the just mentioned platform slopes upwardly if the cutting edge is located at a level above the supporting surface of the table.

The novel features which are considered as characteristic of the invention are set forth in particular in the appended claims. The improved slicing machine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic partly side elevational and partly longitudinal vertical sectional view of a slicing machine which embodies one form of the invention, the table being shown in the inoperative position;

FIG. 2 is a partly elevational and partly sectional view of the upper portion of the slicing machine, with the table shown in the operative position;

FIG. 3 is a schematic plan view of the slicing machine;

FIG. 4 is an enlarged schematic side elevational view of the cutting station in the machine of FIGS. 1 to 3; the table being shown in the position of FIG. 2;

DESCRIPTION OF THE PREFERRED EMBODIMENTS

Figure 6:
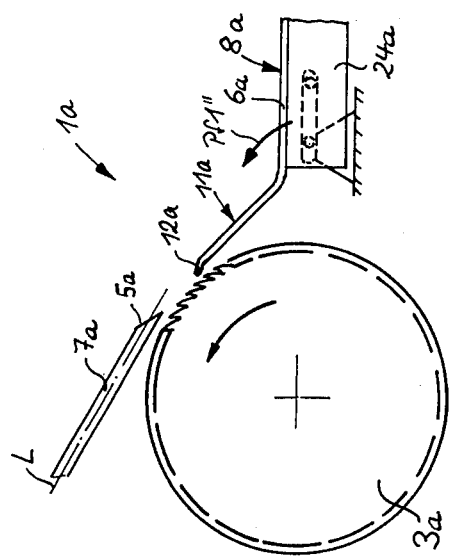
FIG. 6 illustrates the structure of FIG. 5 but with the table shown in the operative position.

Referring to FIGS. 1 to 3, there is shown a slicing machine 1 for meat products 4, e.g., bacon. The machine 1 comprises a frame or support 2 which carries a horizontal feeding roller or wheel 3 and a knife 7 having a cutting edge 5 adjacent to but spaced from the periphery of the feeding roller. The cutting plane which is defined by the knife 7 is substantially tangential to the feeding roller 3 and is inclined downwardly and forwardly, as considered in the direction of feed of the product 4 toward the cutting edge 5, i.e., the cutting edge is located at the rear end of the knife and such rear end is located at a level above the front end. The frame 2 further supports a reciprocable table 6 having a flat upper side 8 which constitutes the supporting surface for the product 4. The table 6 is movable between the inoperative or first position of FIG. 1 and the operative or second position of FIG. 2. In the embodiment of FIGS. 1 to 3, the supporting surface 8 is located at a level above the cutting edge 5 and makes with the cutting plane of the knife 7 an acute angle alpha of 15 to 50°, preferably about 30°. The entire table 6 is located behind the cutting edge 5 as long as the table dwells in the operative position of FIG. 2, i.e., the cutting station (shown at 9) is located in front of and at a level below the supporting surface 8. The front portion 10 of the table 6 includes a forwardly and downwardly sloping platform or chute 11 and a substantially horizontal ledge or leader 12 which is located in front of and at the lower end of the platform. The ledge 12 exposes a portion of the toothed or serrated periphery of the feeding roller 3 when the table 6 is held in the operative position of FIG. 2 so that the product 4 can be caused to slide along the supporting surface 8, thereupon along the downwardly sloping upper side of the platform 11, and thereupon along the horizontal upper side of the ledge 12 to be engaged by the teeth of the roller 3 and fed into the range of the cutting edge 5 at the station 9. When the table 6 is caused or allowed to move to the inoperative position of FIG. 1, the ledge 12 completely conceals the roller 3 and overlies the cutting edge 5 to thus eliminate the likelihood of injury to a careless or unskilled attendant. The platform 11 and ledge 12 can be said to form part of a substantially Z-shaped or S-shaped front portion 10 wherein the ledge 12 constitutes the front leg and the platform 11 constitutes the median part or web. A rear leg (not specifically shown) is preferably recessed into the upper part of the main portion of the table 6 so that its upper side is flush with the supporting surface 8. The inclination of the platform 11 preferably equals or at least approximates the inclination of the knife 7 (see particularly FIG. 4 wherein the wheel 3 is shown without teeth and the phantom line L denotes the longitudinal axis of the knife 7). The ledge 12 need not be horizontal; it has been found, however, that the illustrated machine wherein the upper side of the ledge 12 is parallel to the supporting surface 8 and the inclination of the upper side of the platform 11 with respect to the supporting surface 8 equals the inclination of the plane of the knife 7 and its axis L is highly satisfactory for proper feeding of bacon or the like to the cutting station 9 as well as for reducing or completely eliminating the likelihood of injury to the hand or hands of an attendant.

It is clear that, when the table 6 is held in the operative position of FIG. 2, the front portion 10 (and more particularly the ledge 12) should expose a sufficiently large portion of the feeding roller 3 to insure satisfactory engagement of the product 4 by the teeth of the roller and predictable transport of the product into the range of the knife 7. The product 4 is pulled back by hand (or is pushed back by suitable instrumentalities) upon completion of each slicing step.

As mentioned above, the angle alpha is between 15° and 50°, preferably between 20° and 50°. The angle beta between the upper side of the platform 11 and the surface 8 is preferably between 10° and 45°, most preferably approximately 30°. The length $b$ of the platform 11, as considered in the direction of movement of product 4 therealong, can be several centimeters, e.g., 4 cm. Thus, the platform 11 does not merely constitute a chamfer or facet at the front end of the table 6 but rather a part which extends downwardly well below the underside of the main portion of the table. The thickness of the main portion of the table is shown at $c$ (see FIG. 1). The platform 11 need not be too long because a relatively long platform could interfere with convenience of manual feeding of the product into the range of the feeding roller 3.

FIG. 4 further shows that the angle alpha is not defined by the supporting surface 8 and the upper side of the cutting edge 5 but rather by the surface 8 and the central longitudinal axis L (i.e., the cutting plane) of the knife 7. In the embodiment of FIGS. 1 to 4, the inclination of the upper side of the edge 5 with respect to the supporting surface 8 is less pronounced than the inclination of the axis L.

It has been found that the hand of an attendant (the hand is shown in FIG. 2) is unlikely to descend all the way to and be injured by the feeding wheel 3 and/or knife 7 if the shortest distance $a$ between a forward extension of the supporting surface 8 and a horizontal tangent T to the apex of the roller 3 is approximately 2.5 cm. However, this is the presently preferred shortest distance $a$; such distance can be reduced to 1 cm or increased to 4 cm.

The rear end 13 of the table 6 (namely, that end which is adjacent to the torso of an attendant) is coupled to a displacing device 14 which is designed to automatically shift the table to the inoperative position of FIG. 1 when the machine is not in use and also when the attendant's hand or hands happen to slip forwardly toward the cutting station 9. The displacing device 14 comprises two bell crank levers 14a (see FIG. 3), one at each lateral side of the rear end 13, coaxial pivot members 15 which mount the median portions of the levers 14a in the frame 2, a transversely extending component or bar 18 which is connected to the free ends of the lower arms 17 of the levers 14a, and pins 16a which articulately connect the upper ends of the upper arms 16 of the levers 14a to the respective sides of the rear end 13. At least one relatively strong helical spring 19 is provided to yieldably bias the levers 14a in a counterclockwise direction, as viewed in FIG. 1 or 2, i.e., to permanently urge the table 4 toward the inoperative position of FIG. 1. The arms 16, 17 of each of the two bell crank levers 14a make an obtuse angle. The dimensions of the frame 2 and the position of the bar 18 are selected in such a way that the bar is located at the level of the hips of an attendant standing behind the table 6. The attendant must exert pressure against the bar 18, i.e., such person must pivot the levers 14a clockwise, as viewed in FIG. 1 or 2, and thereupon maintain the bar 18 in the position of FIG. 2 in order to insure that the table 6 will remain in the operative position. As soon as the attendant moves his or her hips rearwardly and away from the bar 18, the spring or springs 19 will be free to contract and the propel the table 6 to the inoperative position of FIG. 1. The placing of the bar 18 at such a level above the ground or floor that this component of the device 14 is located at the level of the hips of an average person is desirable and advantageous because both hands of the attendant remain free for manipulation of the product 4.

Of course, the most important function of the displacing device 14, and especially of its bar 18, is that an attendant instinctively releases the bar in the event of danger of potential accident, for example, when the hand or hands of the attendant slip with respect to the product and move forwardly beyond the normal positions. In fact, the body of the attendant is then likely to bear directly against the rear end 13 of the table 6 and to thus assist the spring or springs 19 in rapidly shifting the table to the inoperative position of FIG. 1. This, coupled with the placing of the supporting surface 8 at a level above the apex of the roller 3 and the cutting edge 5, insures that the hands of an attendant will move forwardly at a level above the tangent T of FIG. 1 and will bypass the cutting station 9 without any injury to the fingers, palms or lower arms. The arrow Pfl denotes in FIG. 2 the direction in which the hand of an attendant is likely to slide if it happens to slip on the product 4 and move forwardly beyond the main portion of the table 6. It has been found that the just discussed features of the machine practically exclude the possibility of injury in the event of slippage of one or both hands of an attendant during forward movement of the product 4 along the supporting surface 8 of the table. The spring or springs 19 are sufficiently strong to insure practically instantaneous movement of the table 6 to the inoperative position of FIG. 1 as soon as the pressure upon the bar 18 decreases sufficiently to enable the spring or springs to take over and to pivot the ball crank levers 14a anticlockwise, as viewed in FIG. 1 or 2. As mentioned above, instinctive movement of the body away from the bar 18 and against the rear end 13 of the table 6 also promotes immediate shifting of the table to the inoperative position when the attendant's hand or hands slip and move forwardly toward the cutting station 9.

The spring-biased displacing device 14 constitutes one automatic safety feature of the improved slicing machine. Another safety feature resides in the provision of a switch 20 (e.g., a microswitch or a magnetic switch) which is in circuit with the motor 103 for the roller 3 and opens automatically in reponse to movement of the table 6 from the operative position of FIG. 2. To this end, the movable portion 20a of the switch 20 is mounted in the path of movement of an actuating element or trip 21 at the underside of the table 6 to be depressed by the trip when the table dwells in the operative position of FIG. 2 and to be released by the trip (to open the circuit of the motor 103) as soon as the table leaves the operative position of FIG. 2 and not later than when the table reaches the inoperative position of FIG. 1. The switch 20 is mounted in the frame 2 or on a part which is secured to the frame. If desired, the machine can be provided with suitable braking means (not specifically shown) which is automatically engaged in response to opening of the switch 20 to immediately arrest the roller 3 as soon as the circuit of the motor 103 is open. This further reduces the likelihood of injury to an attendant. The braking means may comprise one or more shoes or other mechanical braking element which bear against the roller 3 whenever the switch 20 is open. The switch 20 can be installed adjacent to the bar 18 or adjacent one of the levers 14a to be caused or allowed to open as soon as the bar leaves the position of FIG. 2.

The table 6 has two downwardly extending lateral walls or cheeks 24 which are provided with elongated horizontal slots 22 for guide pins 23 of the frame 2. The surfaces bounding the slots 22 cooperate with the guide pins 23 to determine the extent of movement of the table 6 between the operative and inoperative positions. Thus, the pins 23 abut against the surfaces bounding the rear ends of the respective slots 22 when the table 6 is held in the inoperative position of FIG. 1, and the pins 23 abut against the surfaces bounding the front ends of the respective slots 22 when the table is caused to assume the operative position of FIG. 2. The rear ends of the slots 22 are open from below, as at 22a, and the width of the openings 22a at least equals the diameters of the respective guide pins 23 so that the table 6 can be pivoted about the common axis of the pins 15 when it assumes the inoperative position of FIG. 1. This enables the attendant to gain access to the entire or to the major part of the roller 3 and/or knife 7, particularly for the purpose of cleaning. Such pivotability of the table 6 does not represent a danger to the attendant since the switch 20 is then open and the feeding roller 3 is idle. It can be said that the slotted cheeks 24 and the guide pins 23 constitute a means for coupling the front end of the table 6 to the frame 2 in such a way that the supporting surface 8 is substantially horizontal when the coupling means is engaged and that the coupling means holds the table against pivotal movement (to third position) about a horizontal axis in the region of its rear end 13 when the table dwells in the operative position. When the operator's torso depresses the bar 18 to the position which is shown in FIG. 2, the bell cranks 14a maintain the rear end 13 of the table 6 at a level slightly above the front end of the supporting surface 8, i.e., this surface is then inclined forwardly and downwardly. The extent of such inclination of the surface 8 with respect to horizontal can be selected by appropriate dimensioning and mounting of the bell crank levers 14a. Slight forward and downward inclination of the supporting surface 8 in operative position of the table 6 has been found to contribute to more convenient manual feeding of the product 4 toward the platform 11 and on to the cutting station 9.

The front portion 10 of the table 6 can be readily designed in such a way that it shields the top as well as the front, lateral and rear sides of the cutting station 9 when the table assumes the inoperative position of FIG. 1. This practically excludes the posibility of injury to an attendant, especially as long as the table 6 remains in the position of FIG. 1. When the table 6 is pivoted about the common axis of the pins 15 to the (third) position in which the front portion 10 is lifted above and away from the cutting station 9, the motor 103 is idle so that the feeding roller 3 cannot entrain the hand into the range of the cutting edge 5. All an attendant has to observe is the cutting edge 5.

The improved slicing machine is constructed and assembled in such a way that it can satisfy requirements which appear to be mutually exclusive. Thus, the machine is designed to reduce or completely eliminate the likelihood of injury to the hand or hands of an attendant by guiding the hand or hands above and away from the cutting station 9 (as indicated by the arrow Pfl in FIG. 2). At the same time, the machine enables an attendant to move a product, by hand, into immediate proximity of the cutting station 9 as long as the table 6 dwells in the operative position of FIG. 2. The second feature, i.e., the accessibility of the cutting station, actually reduces the likelihood of injury because an attendant is not tempted to mainpulate a product in a manner which is apt to cause injury since the attendant has practically complete freedom to move a relatively small product (e.g., the remnant of a larger piece of bacon) into very close or immediate proximity of the feeding roller 3.

Figure 5:
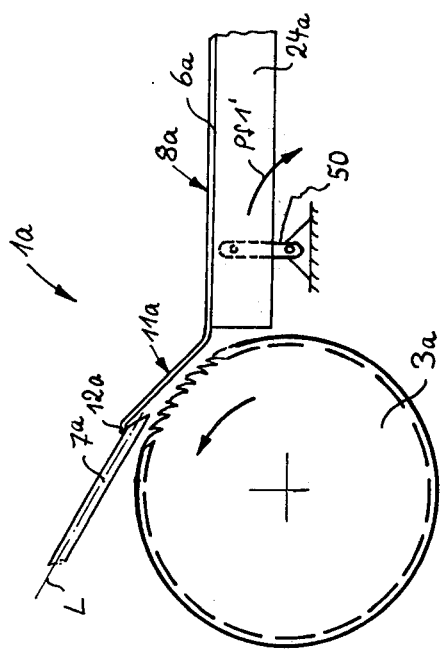
FIG. 5 is a fragmentary schematic side elevational view of a modified slicing machine, with the table shown in the inoperative position.

FIGS. 5 and 6 illustrate a portion of a modified slicing machine 1a wherein the cutting edge 5a is located at a level below the remaining portion of the upwardly and forwardly sloping knife 7a and the platform 11a slopes upwardly at an angle which equals or approximates the inclination of the axis L of the knife 7a with respect to the supporting surface 8a of the table 6a. In other words, the supporting surface 8a is located at a level below the cutting station. The table 6a of FIGS. 5 and 6 is also movable between an operative position (FIG. 6) and an inoperative position (FIG. 5). As schematically shown in FIGS. 5 and 6, the table 6 is mounted on several links 50 (one shown) which are articulately connected to the frame and to the inner sides of the cheeks 24a and compel the table to move rearwardly and to a lower lever (arrow Pfl' in FIG. 5) during travel to the operative position of FIG. 6 or to move in the opposite direction (to a higher level and forwardly as indicated by arrow Pfl") during shifting to the inoperative position.

When the table 6a assumes the inoperative position of FIG. 5, the relatively short ledge or leader 12a at the upper end of the platform 11a completely overlies the cutting edge 5a of the knife 7a and the platform 11a completely shields the feeding roller 3a so that the likelihood or danger of injury is practically non-existent. The parts 11a and 12a of the front portion of the table 6a insure a highly satisfactory advancement of the product (not shown in FIGS. 5-6) into the range of the feeding roller 3a when the table 6a is held in the position of FIG. 6.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

What is claimed is:

1. In a machine for slicing bacon or analogous products, the combination of a support; a knife installed in said support and defining a cutting plane, said knife having a cutting edge; a mobile product feeding device mounted in said support adjacent to said cutting edge; a table mounted in said support for movement between first and second positions in which a portion of said table respectively overlies and exposes said cutting edge and said feeding device, said table having a product supporting surface which is accessible from above so that a product which is placed onto said surface can be manually moved along said surface forwardly into the range of said feeding device in the second position of said table; and displacing means for moving said table between said positions, said displacing means being activatable by an attendant to move said table to and to normally maintain said table in said second position so as to enable such attendant to move a product into the range of said feeding device as long as the attendant maintains the table in said second position through the medium of said displacing means.

2. The combination of claim 1, wherein said feeding device includes a rotary member.

3. The combination of claim 1, wherein said feeding device comprises a member which is rotatable about a horizontal axis, said supporting surface being located at a first level and said member having an apex located at a lower second level, the shortest distance between said levels being 1–4 cm.

4. The combination of claim 3, wherein said shortest distance is approximately 2.5 cm.

5. The combination of claim 1, wherein said supporting surface is located at a level above said cutting edge and said knife slopes forwardly and downwardly, as considered in the direction of movement of the product along said supporting surface and into the range of said feeding device.

6. The combination of claim 1, wherein said portion is the front portion of said table, said front portion being located behind said cutting edge in the second position of said table and including a sloping platform having a relatively short upper side along which the product slides on its way from said supporting surface into the range of said feeding device in the second position of said table.

7. The combination of claim 1, wherein said portion is the front portion of said table, said front portion completely shielding said cutting edge and said feeding device against access from above in the first position of said table.

8. The combination of claim 1, wherein said portion is the front portion of said table and includes a ledge having an upper side spaced apart from and substantially parallel to said supporting surface, the product which is advanced forwardly beyond said supporting surface sliding along said upper side on its way into the range of said feeding device.

9. The combination of claim 1, wherein said supporting surface is at least substantially horizontal in all positions of said table.

10. The combination of claim 1, wherein said table has an end remote from said knife and said displacing means is disposed at said end.

11. The combination of claim 10, wherein said displacing means comprises a component located at the hip level of an attendant standing behind said end and being movable by the hips of such attendant to thereby effect the movement of said table to said second position.

12. The combination of claim 11, wherein said displacing means further comprises a lever pivotally mounted in said support and having a first arm articulately connected with said end of said table and a second arm connected with said component.

13. The combination of claim 1, wherein said cutting plane and said supporting surface make an acute angle of at least 15°.

14. The combination of claim 13, wherein said angle is between 20° and 50°.

15. The combination of claim 13, wherein said angle is approximately 30°.

16. The combination of claim 13, wherein said portion of said table is the front portion thereof and said front portion includes a platform located forwardly of said supporting surface and having an upper side which is substantially parallel to said cutting plane, and a ledge located in front of said platform and having an upper side whose inclination with respect to said supporting surface is less pronounced than the inclination of said cutting plane.

17. The combination of claim 16, wherein the upper side of said ledge is substantially parallel to said supporting surface.

18. The combination of claim 1, further comprising pivot means provided in said support, said table being turnably mounted on said pivot means for movement to a third position in which said portion thereof is raised above said feeding device.

19. The combination of claim 18, wherein said table has an end remote from said feeding device and said pivot means is disposed in the region of said end of said table.

20. The combination of claim 18, further comprising means for holding said table against movement of said third position in the second position of said table.

21. The combination of claim 1, further comprising means for yieldably biasing said table to said first position.

22. The combination of claim 1, wherein said portion of said table has an upper side which slopes forwardly and downwardly at an angle of 10°–45° with respect to said supporting surface and has a length of approximately 4 cm, as considered in the direction of advancement of the product along said supporting surface, thereupon along said upper side and into the range of said feeding device.

23. The combination of claim 22, wherein said last mentioned angle is approximately 30°.

24. The combination of claim 22, wherein said cutting plane and said supporting surface make an acute angle of at least 15° and said first mentioned angle equals said last mentioned angle.

25. In a machine for slicing bacon or analogous products, the combination of a support; a knife installed in said support and defining a cutting plane, said knife having a cutting edge; a mobile product feeding device mounted in said support adjacent to said cutting edge; a table mounted in said support for movement between first and second positions in which a portion of said table respectively overlies and exposes said cutting edge and said feeding device, said table having a product supporting surface which is accessible from above so that a product which is placed onto said surface can be manually moved along said surface forwardly into the range of said feeding device in the second position of said table, said cutting plane and said supporting surface making an acute angle of at least 15° and means for arresting said feeding device in response to movement of said table from said second position.

26. The combination of claim 25, wherein said feeding device comprises a rotary member and an electric motor for said rotary member, said arresting means comprising a switch in circuit with said motor and mounted in said support below said table, and actuating means provided on said table and operative to affect the opening of said switch on movement of said table from said second position.

27. In a machine for slicing bacon or analogous products, the combination of a support; a knife installed in said support and defining a cutting plane, said knife having a cutting edge; a mobile product feeding device mounted in said support adjacent to said cutting edge; a table mounted in said support for movement between first and second positions in which a portion of said table respectively overlies and exposes said cutting edge and said feeding device, said table having a product supporting surface which is accessible from above so that a product which is placed onto said surface can be manually moved along said surface forwardly into the range of said feeding device in the second position of said table, said cutting plane and said supporting surface making an acute angle of at least 15°; pivot means provided in said support, said table being turnably mounted on said pivot means for movement to a third position in which said portion thereof is raised above said feeding device; and means for arresting said feeding device in the third position of said table.

* * * * *